(No Model.) 4 Sheets—Sheet 1.
W. WOOD.
CARDING AND SPINNING MACHINERY FOR THE MANUFACTURE OF ASBESTUS YARN, &c.
No. 293,391. Patented Feb. 12, 1884.
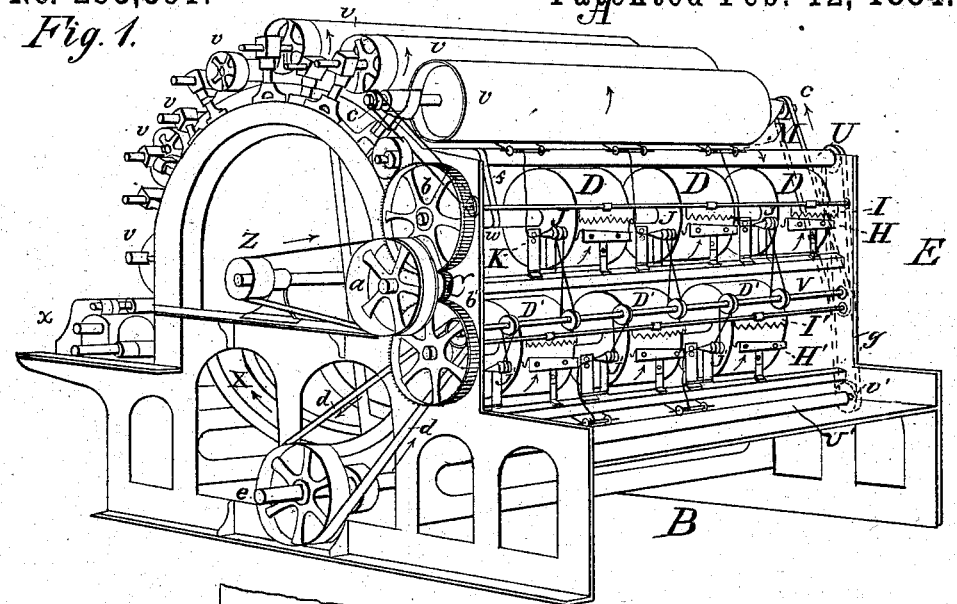
Fig. 1.
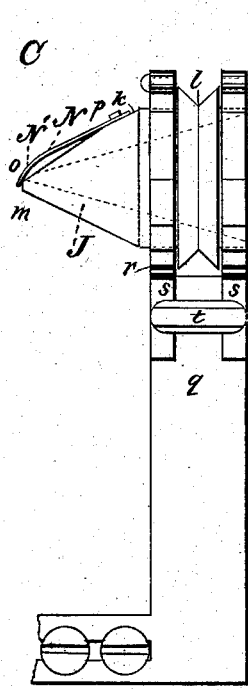
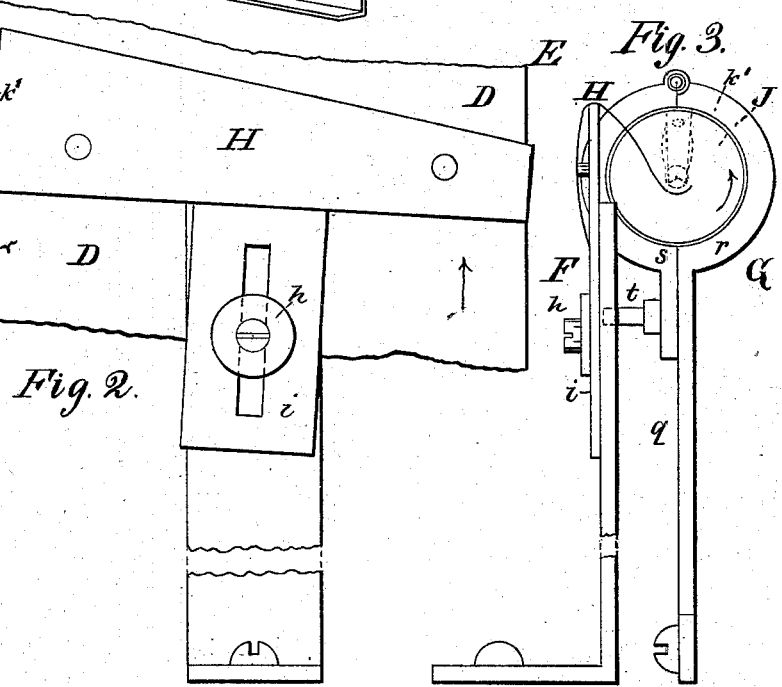
Fig. 2. Fig. 3.
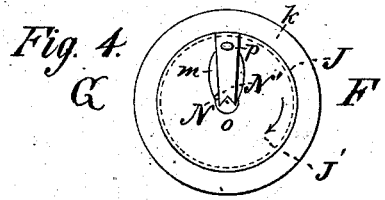
Fig. 4.
WITNESSES:
George R. Ide.
W. A. Cheyney
INVENTOR
William Wood
per C. Henry Roney
ATTORNEY (No Model.)  4 Sheets—Sheet 2.

W. WOOD.
CARDING AND SPINNING MACHINERY FOR THE MANUFACTURE OF ASBESTUS YARN, &c.

No. 293,391.  Patented Feb. 12, 1884.

WITNESSES:
George R. Ide
W. A. Cheyney

INVENTOR
William Wood
per E. Henry Roney
ATTORNEY (No Model.) 4 Sheets—Sheet 4.
W. WOOD.
CARDING AND SPINNING MACHINERY FOR THE MANUFACTURE OF ASBESTUS YARN, &c.
No. 293,391. Patented Feb. 12, 1884.
*Fig. 7*
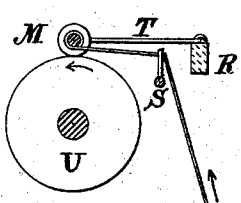
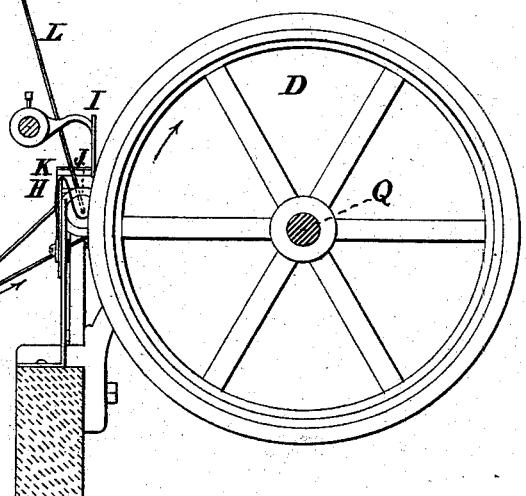
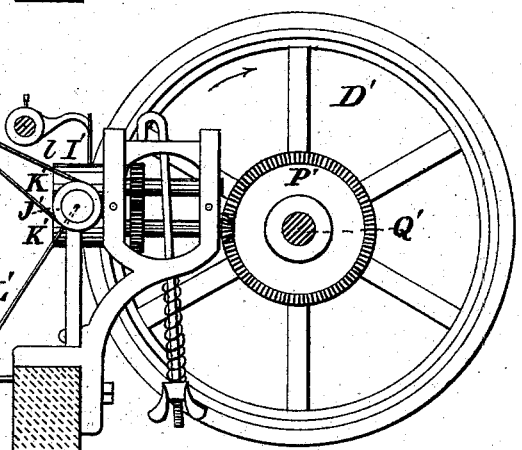
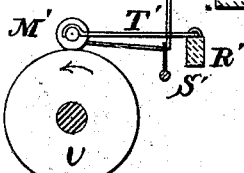
WITNESSES:
George R. Ide.
W. A. Cheyney
INVENTOR
William Wood
per C. Henry Roney
ATTORNEY

UNITED STATES PATENT OFFICE.

WILLIAM WOOD, OF PHILADELPHIA, PENNSYLVANIA.

CARDING AND SPINNING MACHINERY FOR THE MANUFACTURE OF ASBESTUS YARN, &c.

SPECIFICATION forming part of Letters Patent No. 293,891, dated February 12, 1884.

Application filed March 16, 1882. (No model.)

*To all whom it may concern:*

Be it known that I, WILLIAM WOOD, a citizen of the United States, residing at Philadelphia, in the county of Philadelphia and State of Pennsylvania, have invented certain new and useful Improvements in Carding and Spinning Machinery for the Manufacture of Asbestus Yarn, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to carding and spinning machinery for the manufacture of asbestus yarn, &c.; and it consists in the combination of doffers divided into three or more sections, according to the width of the carding-machine used and the size of the thread desired, with separate sectional doffing-combs, adjustable receiving-shells, automatic twisting-tubes, and delivering-rollers to each section, all being on one machine. I attain these objects by the combination of the several devices shown in the accompanying drawings, in which—

Figure 5:
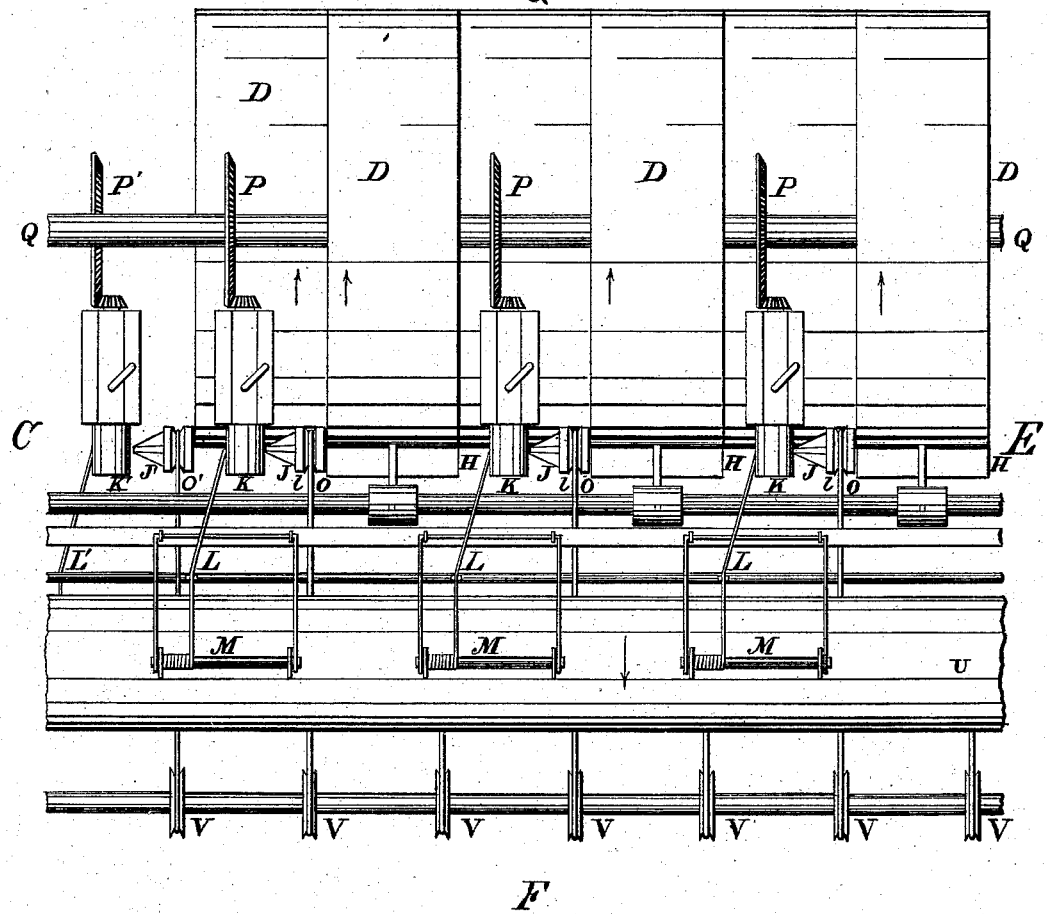
Figure 6:
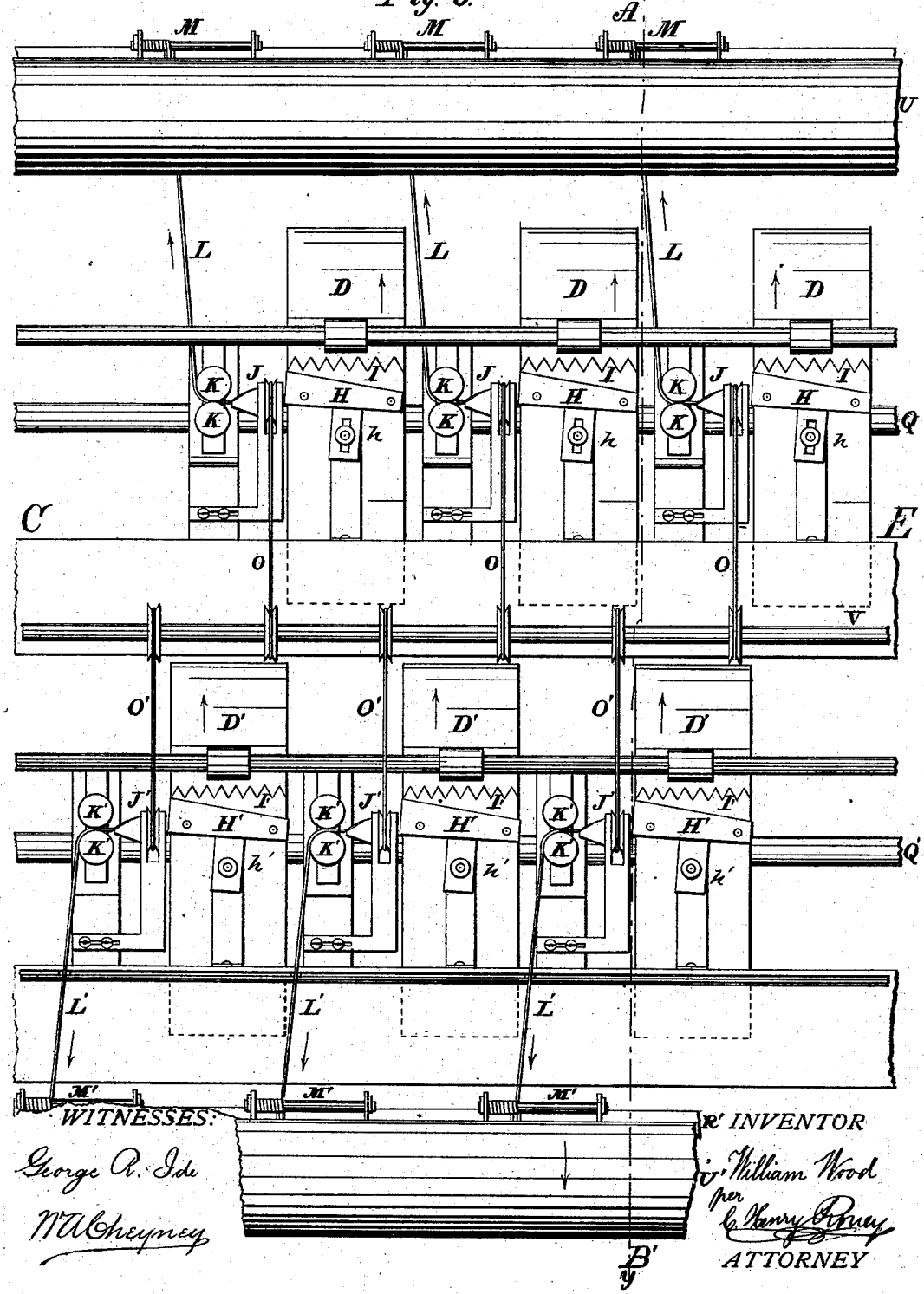

Figure 1 is a perspective view of a carding-engine with my improvement applied thereto. Fig. 2 is an elevation of adjustable receiving-shell and automatic adjusting twisting-tube, with supports or standards therefor. Fig. 3 is an end view of the automatic adjusting twisting-tube, with its standard, looking from the larger end thereof. Fig. 4 is an end view of point of twisting-tube, looking from an opposite direction to that in Fig. 3. Fig. 5 is a plan of a machine containing my improvement. Fig. 6 is a front elevation of the same. Fig. 7 is a transverse section of the machine on line $y\ y$, Fig. 6.

My improvement is specially adapted to carding and spinning or twisting asbestus, amianthus, and chrysotile, (which are all known commercially by the name of "asbestus.") Owing to their smooth and slippery nature, it has heretofore been difficult to spin or handle them without a preliminary or false twist or the admixture of other fiber. By the use of my improvement the asbestus thread is spun by it without any preliminary or false twist, or the admixture of other fibers, or subsequent twisting or spinning, and can be woven into cloth or used as wick or packing, according to the twist required and given to it.

I am aware that asbestus has been twisted or spun into thread by hand and by power machinery by the admixture of vegetable or other fibers, in order to keep the asbestus together and enable it to be worked on the machine, as, owing to the smooth and slippery nature of the asbestus fiber, it is very difficult to handle it without such addition and without a positive twist, such as I put in by my device.

In carrying out my invention the sectional doffers D D', sectional doffing-combs I I', automatic adjusting twisting-tubes J J', delivering-rollers K K', and spools M M', in combination with the receiving-shells H H', are driven by pulleys, belting, and gearing suitably arranged for the purpose, as follows: the doffer-shafts Q Q' being driven, as usual, from the end of the main cylinder X by a belt, Z, running from a pulley on the end of the cylinder-shaft to a pulley, $a$, geared to the doffer-shaft wheels $b\ b'$ by means of a pinion secured to a stud in said pulley. The sectional doffing-combs I I' are arranged on two shafts in front of and corresponding in number with the sectional doffers D D'. The comb-shafts—which are of the form shown, for instance, in the patent to E. Wright, No. 188,833—have the ordinary vibratory motion usual in such comb-shafts, and are driven, as usual, by belts from the ends of the "fancy" shaft $c\ c$, the doffing combs or knives being divided into sections, to admit the twisting-tubes J J' and delivering-rollers K K' into their proper positions, as shown. The automatic adjusting twisting-tubes J J' are driven by belting O O' from a counter-shaft, V, in front of the machine, this counter-shaft V being driven by a belt, $d\ d$, from the carrying-shaft $e$ under the carding-engine, this carrying-shaft $e$ being the same shaft that carries the "stripper" and "fancy" belt, as usual. The delivering-rollers K K' are driven by bevel-gearing P P' on the doffer-shafts Q Q' at the end of each sectional doffer D D'. The top bobbin-winding roller, U, is driven by a belt, f, from a pulley, w, on the top doffer-shaft, Q, the bottom bobbin-winding roller, U', being driven by a belt, g, running from a pulley on the top roller, U, to a pulley, v', on said bottom roller, the bobbins M M' being revolved by friction as they rest on the top of the rollers U U', the top winding-roller, U, being placed above the top row of sectional doffers D, and the bottom winding-roller, U', in front of and below the bottom row of sectional doffers D'. The fiber is combed from the sectional doffers D D' into the adjustable receiving-shells H H' and drawn through the automatic adjusting twisting-tubes J J' by a pair of delivering-rollers, K K', arranged at the end of each sectional doffer D D', of which I may have three or more on each carding-engine, according to the width of the carding-engine or the thickness of the thread required. The space at the end of and between the sectional doffers D D' and corresponding sectional doffing-combs I I' gives the necessary room for the automatic adjusting twisting-tubes J J' and delivering-rollers K K' and the gearing driving the rollers, which gearing may be of the usual kind and character used in machinery, and suitably arranged for the purpose, as shown in the drawings. I arrange the sectional doffers D D' on two or more shafts, Q and Q', one shaft, Q, above the other shaft, Q', the sectional doffers D D on the upper shaft, Q, being over the twisting-tubes J' and delivering-rollers K' of the lower series of sectional doffers D', so that the stuff may be taken off the whole length of the cylinder X by the sectional doffers D and D' without interfering with each other.

As a matter of convenience, and for the purpose of changing the position of the receiving-shells H H', I make them adjustable to suit the quantity and quality of the material used, the adjustment being effected by raising or lowering either end of the receiving-shell H H', or the whole shell, by means of the adjusting-screw h and slotted standard i. The object and purpose of placing the adjustable receiving-shells in the slightly-inclined position or angle shown in the drawings, Figs. 2, 5, and 6, is to enable them to be adjusted to allow sufficient space below the doffer-comb at the end farthest from its twisting-tube for the accumulation of the loose material as it is combed therein, where it is very loose and occupies much space and becomes smaller, occupying less space below the doffing-comb as it is gradually twisted and drawn nearer to and into the twisting-tube. Any difference in the quality and length of the fiber used will require a change in the angle at which the receiving-shell must be set to give the best results. As long fiber will take the twist better than short fiber, the latter must be held more closely to the doffing-comb or knife at the end farthest from the twisting-tube and requires the shell to be raised proportionally at that end. The size of thread is governed by the amount of material fed into the machine at the feed-rollers x, Fig. 1, and the receiving-shell must be raised or lowered to suit the increased or diminished amount of material used.

My automatic adjusting twisting-tubes J J' are composed of a conical tube, with shoulders k k' and pulley l near the larger end, the point m being beveled off on one side of the apex, and fitted with an elastic plate, N N', notched at the apex o, and attached at the base p to the cone of the twisting-tube J. The shoulders of my twisting-tube J J' are supported by a standard, q, with two bearings, r r, the caps or covers s s of the bearings being hinged on and fastened or released by the movable key t t, so that the twisting-tube J J' may revolve freely in its bearings r r when driven by the belt O O' from the counter-shaft V. The notched elastic plate N N' is adjusted so that it will press the stuff which is being twisted against the opposite side of the apex of the cone m, and at the same time have sufficient elasticity to allow the twisted stuff or thread L L' to be drawn through it by the delivering-rollers K K'. Any other suitable form of twisting tube or head may be used; but I prefer the one described.

The operation of my improvement is as follows: The fiber used, (asbestus, amianthus, or chrysotile,) in proper condition, is fed to the carding-engine at x in the usual manner, and carried around the cylinder X and cards v v v v, as usual, to the sectional doffers D D', from which it is combed by the combs I I' onto the receiving-shells H H', which support it while it is being twisted or spun by the automatic adjusting twisting-tubes J J' and delivering-rollers K K', which draw it through the twisting-tube J J' and deliver it to the bobbins M M', which rest on the winding-rollers U U', and are driven by them by friction, all being driven by suitable pulleys, belting, and gearing, as previously described. As in the accompanying drawings, if a carding-engine, Fig. 1, of twenty-four (24) inches in width, with six (6) sectional doffers (three on each shaft) of four (4) inches each, to make a certain size of thread, be employed, as the size of the carding-engine is increased, the number of sectional doffers may be increased or the size of the thread varied. As the number of sectional doffers is increased, additional combs, adjustable receiving-shells, automatic adjusting twisting-tubes, delivering-rollers, and bobbins must be added in proportion.

What I claim as my invention, and desire to secure by Letters Patent, is—

1. The combination, with the main cylinder, of the sectional doffer-cylinders, the doffing-combs, receiving-shells, twisting-tubes, delivery-rollers, bobbin-winding rollers, and means for operating said parts, substantially as described.

2. The combination, with the main cylinder, of the doffer-cylinder, twisting-tube and delivery-rollers, doffing-comb, receiving-shell, and means for operating said parts, substantially as described.

3. The combination, with the doffing-cylinder and doffing-knife, of the receiving-shell, and means for supporting and adjusting said shell, the twisting-tube, drawing-rolls, and means for operating said parts, substantially as and for the purpose set forth.

WILLIAM WOOD.

Witnesses:
 C. HENRY RONEY,
 GEORGE R. IDE.